United States Patent
Ji et al.

(10) Patent No.: US 11,531,129 B2
(45) Date of Patent: Dec. 20, 2022

(54) PICKING SEISMIC STACKING VELOCITY BASED ON STRUCTURES IN A SUBTERRANEAN FORMATION

(71) Applicant: Saudi Arabian Oil Company, Dhahran (SA)

(72) Inventors: Xu Ji, Dhahran (SA); Yi Luo, Dhahran (SA); Tak Man Desmond Lee, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 692 days.

(21) Appl. No.: 16/427,008

(22) Filed: May 30, 2019

(65) Prior Publication Data
US 2020/0379136 A1 Dec. 3, 2020

(51) Int. Cl.
*G01V 1/30* (2006.01)
*G01V 1/36* (2006.01)

(52) U.S. Cl.
CPC ............. *G01V 1/303* (2013.01); *G01V 1/306* (2013.01); *G01V 1/364* (2013.01); *G01V 2210/1295* (2013.01); *G01V 2210/1425* (2013.01); *G01V 2210/27* (2013.01); *G01V 2210/6222* (2013.01); *G01V 2210/64* (2013.01)

(58) Field of Classification Search
CPC ........ G01V 1/303; G01V 1/306; G01V 1/364; G01V 1/301; G01V 2210/64; G01V 2210/1425; G01V 2210/1295; G01V 2210/27; G01V 1/362; G01V 2210/47; G01V 2210/6222
See application file for complete search history.

(56) References Cited

U.S. PATENT DOCUMENTS

| | | | |
|---|---|---|---|
| 4,740,928 A * | 4/1988 | Gutowski | G01V 1/50 367/27 |
| 4,984,220 A | 1/1991 | Bodine et al. | |
| 5,978,314 A | 11/1999 | Pham | |
| 6,493,634 B1 * | 12/2002 | Krebs | G01V 1/303 702/14 |
| 6,996,028 B2 | 2/2006 | Bernth et al. | |
| 9,797,243 B2 * | 10/2017 | Willis | G01V 1/50 |
| 2004/0196739 A1 | 10/2004 | Daube et al. | |
| 2004/0199331 A1 | 10/2004 | Mandal | |
| 2016/0054465 A1 * | 2/2016 | Lamont | G01V 1/364 367/24 |

FOREIGN PATENT DOCUMENTS

| | | |
|---|---|---|
| AU | 2016202792 | 11/2017 |
| CN | 104932016 | 9/2015 |

OTHER PUBLICATIONS

GCC Examination Report in GCC Appln. No. GC 2020-39838, dated Aug. 24, 2021, 4 pages.

(Continued)

*Primary Examiner* — Elias Desta
(74) *Attorney, Agent, or Firm* — Fish & Richardson P.C.

(57) ABSTRACT

Systems and methods for picking seismic stacking velocity based on structures in a subterranean formation include: receiving seismic data representing a subterranean formation; generating semblance spectrums from the seismic data representing the subterranean formation; smoothing the semblance spectrums; and picking stacking velocities based on the smoothed semblance spectrums.

18 Claims, 8 Drawing Sheets

(56) References Cited

OTHER PUBLICATIONS

Clapp, "Semblance picking", Stanford Exploration Project, Report 113, Jul. 8, 2003, 323-331, 8 pages.
PCT International Search Report and Written Opinion in International Application No. PCT/US2020/034,894, dated Sep. 15, 2020, 40 pages.
Bilas, "Automated high-density constrained velocity picking," Recorder, Official Publication of the Canadian Society of Exploration Geophysicts, vol. 31, No. 6, Jun. 2006, 14 pages.
Hale, "Structure-oriented smoothing and semblance," CWP Report 635, Jan. 2009, 10 pages.

* cited by examiner

PICKING SEISMIC STACKING VELOCITY BASED ON STRUCTURES IN A SUBTERRANEAN FORMATION

TECHNICAL FIELD

The present disclosure generally relates to an approach for picking seismic stacking velocity based on structures in a subterranean formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

Generating a model of a subterranean formation based on seismic and other data obtained from the subterranean formation requires accounting for physical characteristics of the seismic data acquisition process. One approach to improving the signal-to-noise ratio of the seismic data is by stacking a number of adjacent seismic traces generated by an array or line of sensors to cancel out noise associated with, for example, heterogeneities in the subterranean formation. However, the travel time of a reflected seismic wave is a function of parameters that include the depth of a reflecting horizon and the offset between the source generating the wave and the sensor observing arrival of the seismic wave at a particular location. Before stacking the adjacent traces, a stacking velocity is used to correct the arrival times of events in the traces for their varying offsets prior to summing, or stacking, the traces to improve the signal-to-noise ratio of the data.

This specification describes an approach for automatically picking stacking velocities while making subsurface seismic images. This approach incorporates structure-oriented smoothing (SOS). SOS is a filtering technique that smooths an image along structures embedded in the image. The smoothing can prevent the picking algorithm from selecting rapid velocity jitters so that the picked velocity follows the trend of the stacking velocity variation in space. This approach can also incorporate an anti-multiple Gaussian discriminator and regularized velocity inversion. The anti-multiple Gaussian discriminator uses a Gaussian filter to decrease the semblance energy that potentially results from stacking multiple seismic traces. After the stacking velocity is picked, a regularized inversion algorithm is used to reduce rapid vertical and spatial interval velocity variations. This approach can provide stacking velocities that are smooth and follow the geological velocity trend of the subterranean formation.

Some methods for picking seismic stacking velocity based on structures in a subterranean formation include: receiving seismic data representing a subterranean formation; generating semblance spectrums from the seismic data representing the subterranean formation; smoothing the semblance spectrums; and picking stacking velocities based on the smoothed semblance spectrums. Embodiments of these methods can include one or more of the following features.

In some embodiments, methods also include refining the stacking velocities. In some cases, refining the stacking velocities comprises applying a regularized inversion algorithm. In some cases, applying a regularized inversion algorithm comprises inverting a picked root mean square velocity for an interval to mute rapid vertical and spatial variations.

In some embodiments, methods also include generating a stacked image

In some embodiments, methods also include generating a set of trial velocities.

In some embodiments, methods also include smoothing the semblance spectrums comprises calculating total energy within a window. In some cases, picking stacking velocities based on the smoothed semblance spectrums comprises applying a Gaussian filter to the smoothed semblance spectrums. In some cases, picking stacking velocities based on the smoothed semblance spectrums comprises picking the stacking velocity at each location by selecting the local peak amplitude that is nearest to the central velocity after the Gaussian filter is applied.

Some systems for picking seismic stacking velocity based on structures in a subterranean formation include: a stacking velocity picking engine including: a semblance generation module operable to generates semblance spectrums from the seismic data representing the subterranean formation; a structural oriented smoothing module operable to smooths semblance spectrums based on structures in the subterranean formation; and a velocity-picking module operable to picks stacking velocities based on the smoothed semblance spectrums. Embodiments of these systems can include one or more of the following features.

In some embodiments, systems also include a semblance adjustment module that reduces semblance values associated with seismic multiples.

In some embodiments, systems also include an inversion module that refines the stacking velocities by applying a regularized inversion algorithm. In some cases, the inversion module applies a regularized inversion algorithm inverting a picked root mean square velocity for an interval to mute rapid vertical and spatial variations.

In some embodiments, the structural oriented smoothing module is operable to generate a stacked image based the stacking velocities picked by the velocity-picking module operable to picks stacking velocities based on the smoothed semblance spectrums.

In some embodiments, the velocity-picking module is operable to generate a set of trial velocities. In some cases, the velocity-picking module is operable to apply a Gaussian filter to the smoothed semblance spectrums. In some cases, the velocity-picking module is operable to select a local peak amplitude that is nearest to a central velocity after the Gaussian filter is applied.

In some embodiments, the structural oriented smoothing module is operable to calculate total energy within a window.

The approach described in this specification provide systems and methods that reduces the time required to generate stacked images from several weeks to several days. This improvement is significant because a survey of production seismic data processing indicates that about 40% of the associated man-hours are spent on picking stacking velocities, which is an essential function for making subsurface images.

In addition, these systems and methods account for three-dimensional variations in subterranean formations that cannot be perceived by an analyst manually picking stacking velocities based on a two-dimensional image. Prototypes of these systems and methods have been used to generate stacked images that are sharper and clearer than stacked images based on manually picked stacking velocities based on the same data.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes an approach for automatically picking stacking velocities while making subsurface seismic images. This approach incorporates SOS. SOS is a filtering technique that smooths an image along structures embedded in the image. The smoothing can prevent the picking algorithm from selecting rapid velocity jitters, so the picked velocity follows the trend of the stacking velocity variation in space. This approach can also incorporate using an anti-multiple Gaussian discriminator and regularized velocity inversion. The anti-multiple Gaussian discriminator uses a Gaussian filter to decrease the semblance energy that potentially results from stacking multiple seismic traces. After the stacking velocity is picked, a regularized inversion algorithm is used to punish for rapid vertical and spatial interval velocity variations. This approach provides stacking velocities that are smooth and follow the geological velocity trend of the subterranean formation.

This approach is based on the observation it is important to follow the spatial variation trend of the stacking velocity. The described systems and methods reflect the spatial variations in the stacking velocity by smoothing the velocity semblance spectrums used as input to the velocity picking process. Smoothing the velocity semblance spectrums along structures in the subterranean formation allows these systems and methods to account for non-horizontal structures that limit the effectiveness Gaussian-type of isotropic smoothing.

Figure 1:
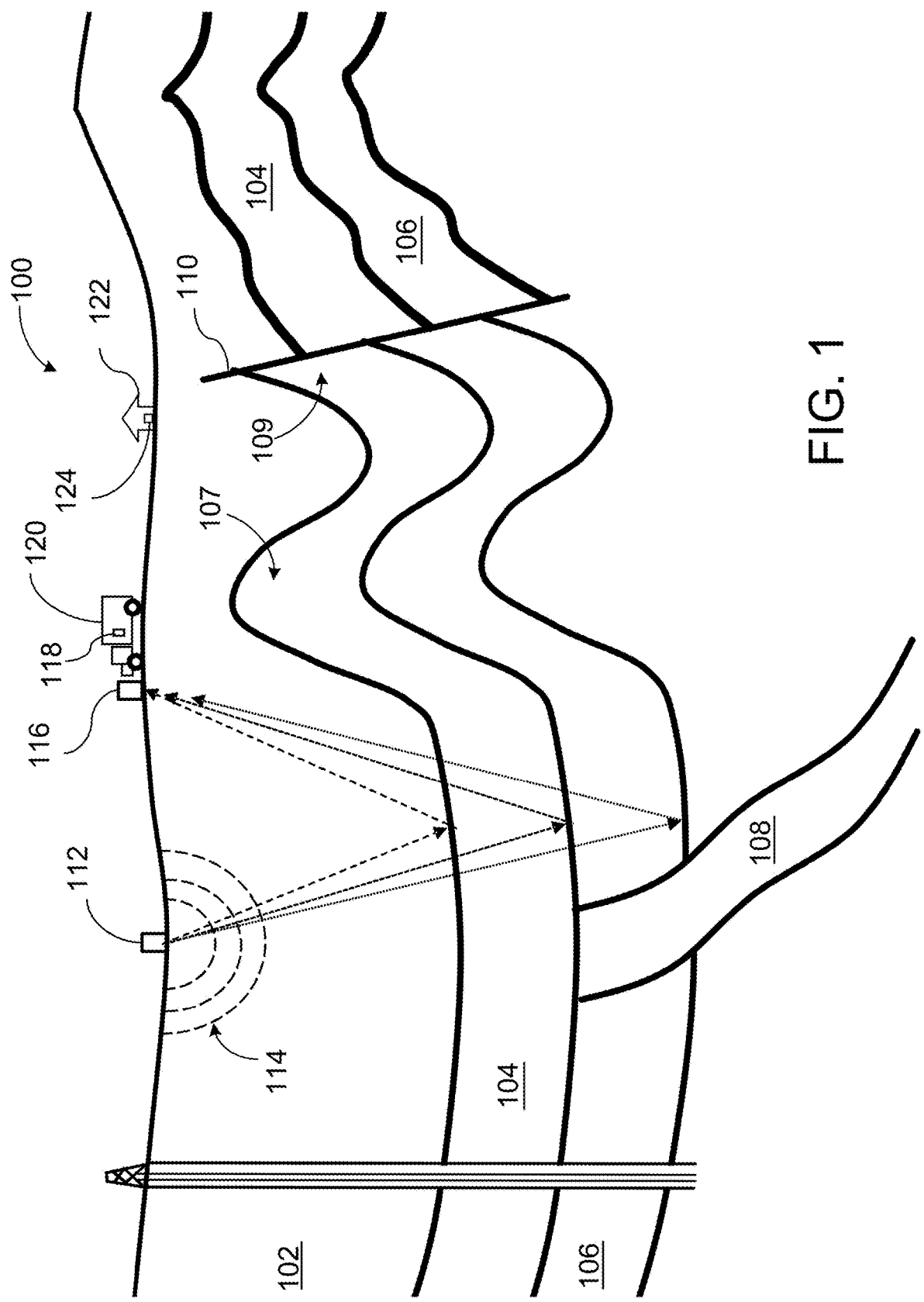
FIG. 1 is a schematic view of a seismic survey being performed to map subterranean features such as facies and faults.

FIG. 1 is a schematic view of a seismic survey being performed to map subterranean features such as facies and faults in a subterranean formation 100. The seismic survey provides the underlying basis for implementation of the systems and methods described with reference to FIGS. 5 and 6. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
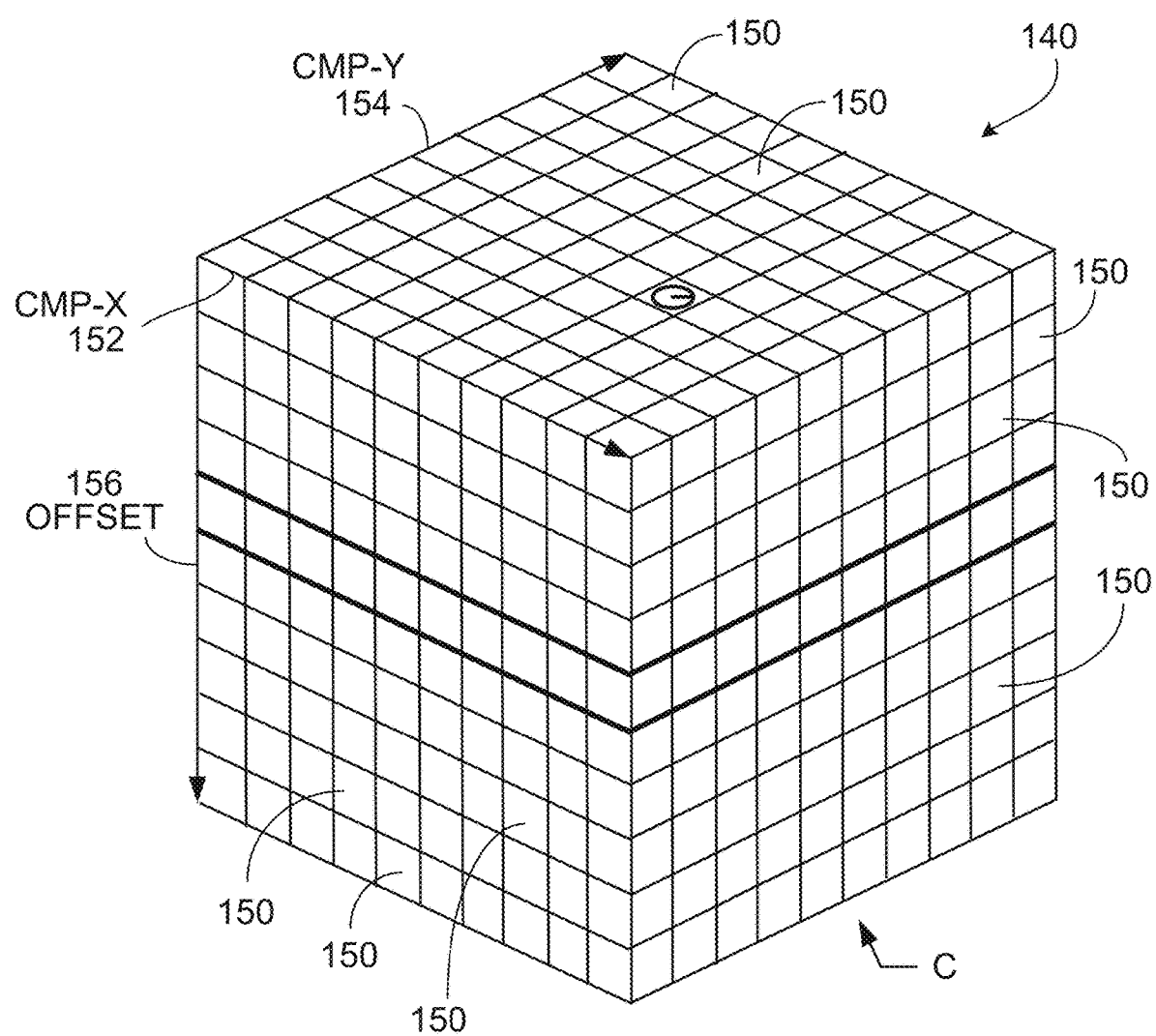
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a Delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
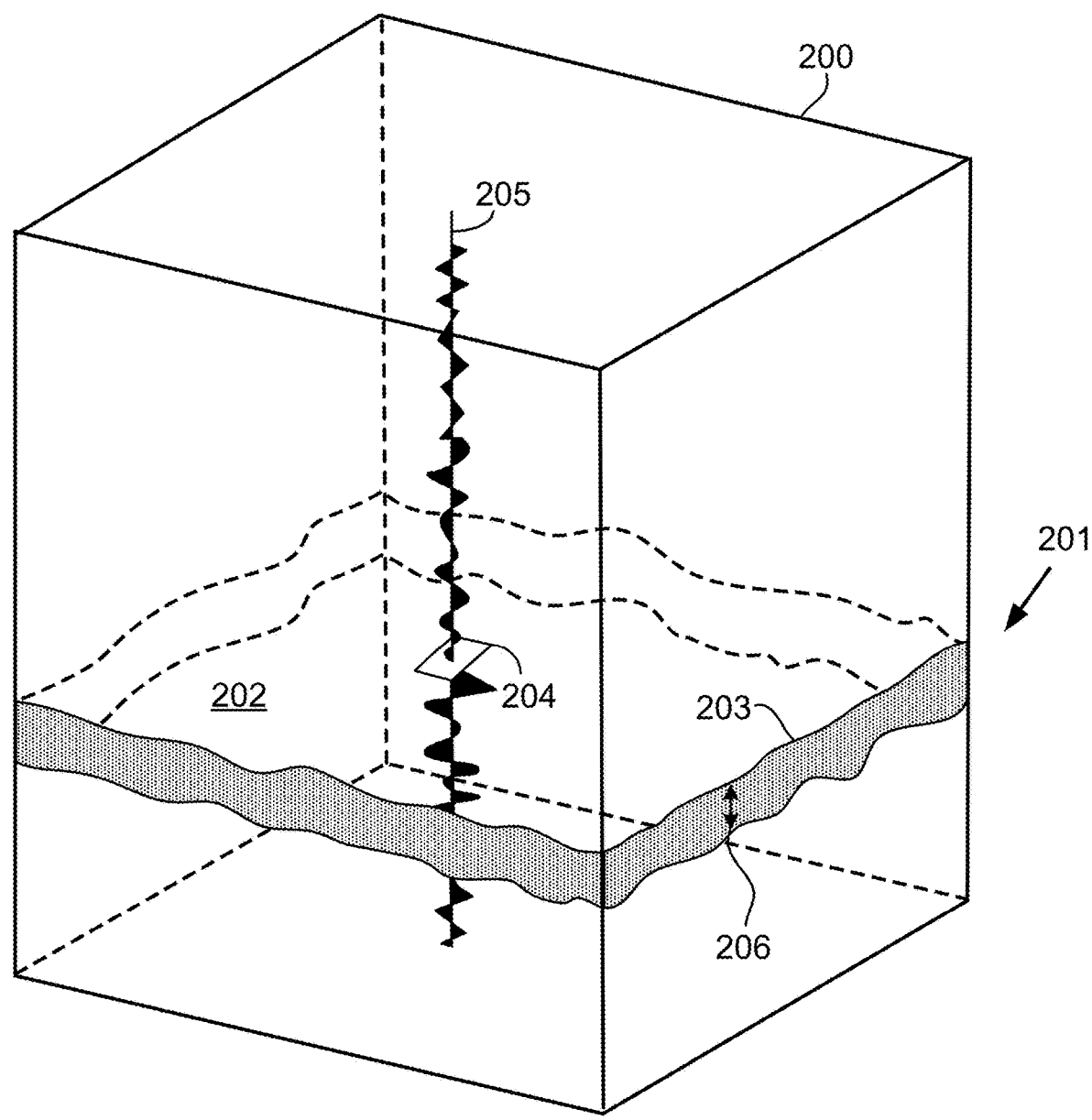
FIG. 3 illustrates a stratigraphic trace within the three-dimensional cube of FIG. 2.

FIG. 3 illustrates a seismic cube 200 representing a formation. The seismic cube has a stratum 201 based on a surface (for example, amplitude surface 202) and a stratigraphic horizon 203. The amplitude surface 202 and the stratigraphic horizon 203 are grids that include many cells such as exemplary cell 204. Each cell is a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

Figure 4C:
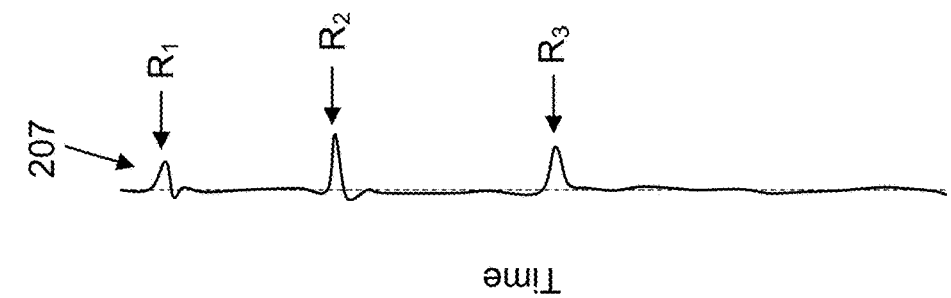
FIGS. 4A-4C illustrate normal moveout correction and stacking a set of seismic traces.
Figure 4B:
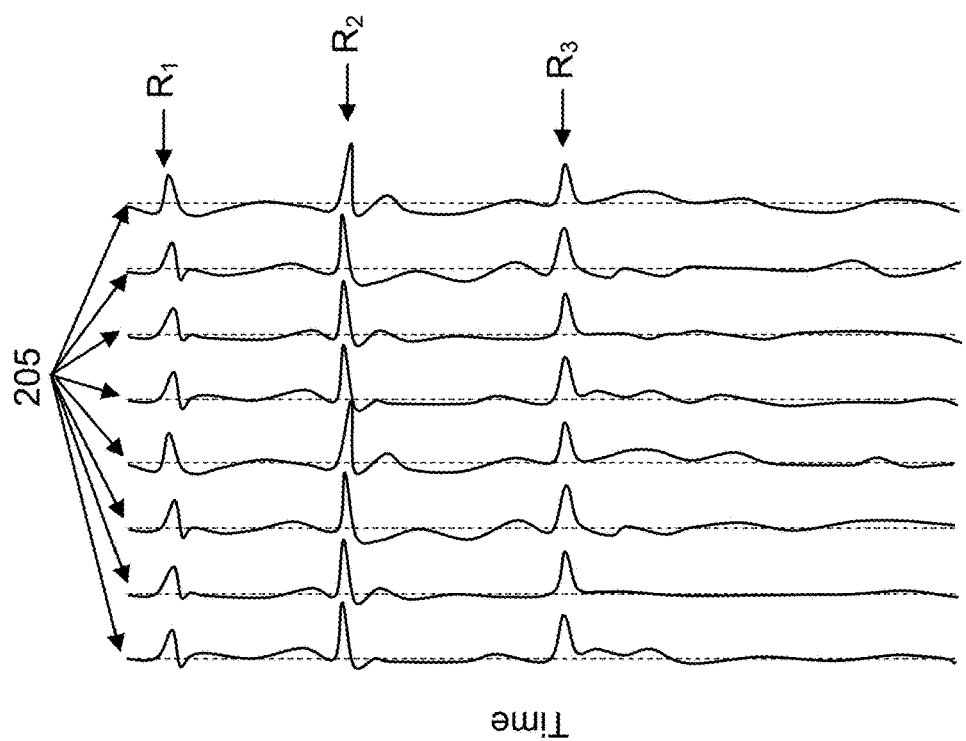
Figure 4A:
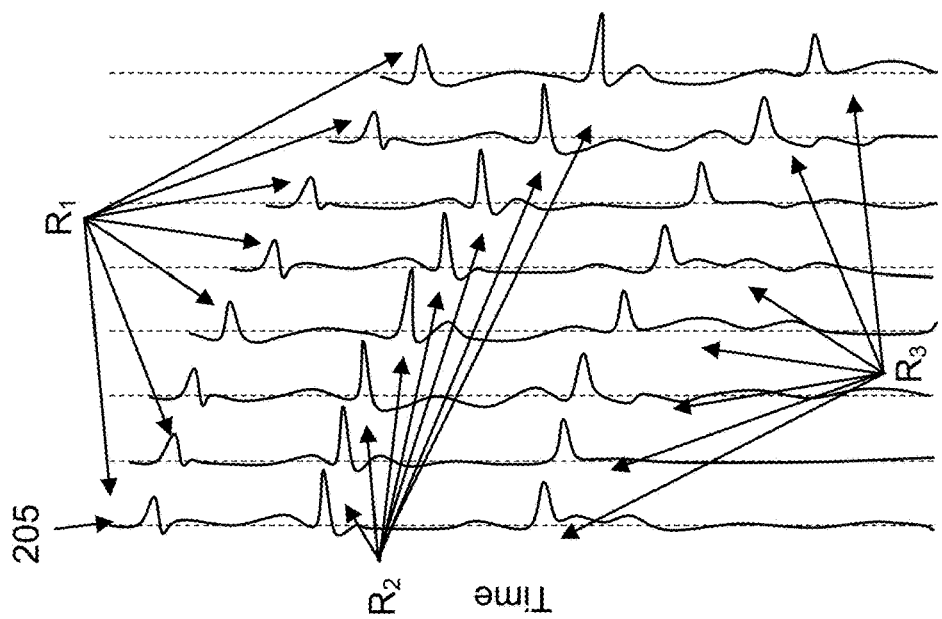

FIGS. 4A, 4B, and 4C schematically illustrate the process of stacking a group of seismic traces 205 to improve the signal to noise ratio of the traces. FIG. 4A illustrates a common midpoint (CMP) gather of eight of the seismic traces 205 generated by a set of sources and sensors that share a common midpoint. For ease of explanation, the traces are assumed to have been generated by reflections from three horizontal horizons.

The seismic traces 205 are arranged with increasing offset from the CMP. The offset of the seismic traces 205 from the CMP increases from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections ($R_1$, $R_2$, $R_3$) from each of the horizons to arrive for source-sensor pairs with increasing offsets from the CMP reflects this increased slant time.

FIG. 4B shows the seismic traces 205 after normal moveout (NMO) correction. NMO is the difference between vertical reflection time and the slant reflection time for a given source-sensor pair. This correction places reflections ($R_1$, $R_2$, $R_3$) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset for a specific source-sensor pair are known parameters for each trace. However, the velocity is usually not readily available. As previously discussed, the velocity of seismic waves depends properties, for example, density, porosity, and fluid content, of the medium through which the seismic waves are traveling and consequently varies with location in the subterranean formation be studied.

FIG. 4C shows a stack trace 207 generated by summing the seismic traces 205 of the CMP gather and dividing the resulting amplitudes by the number of traces in the gather. The number of traces in the gather is also referred to as the fold of the gather. The noise tends to cancel out and the reflections ($R_1$, $R_2$, $R_3$) from the horizons of the subterranean formation are enhanced.

Figure 5:
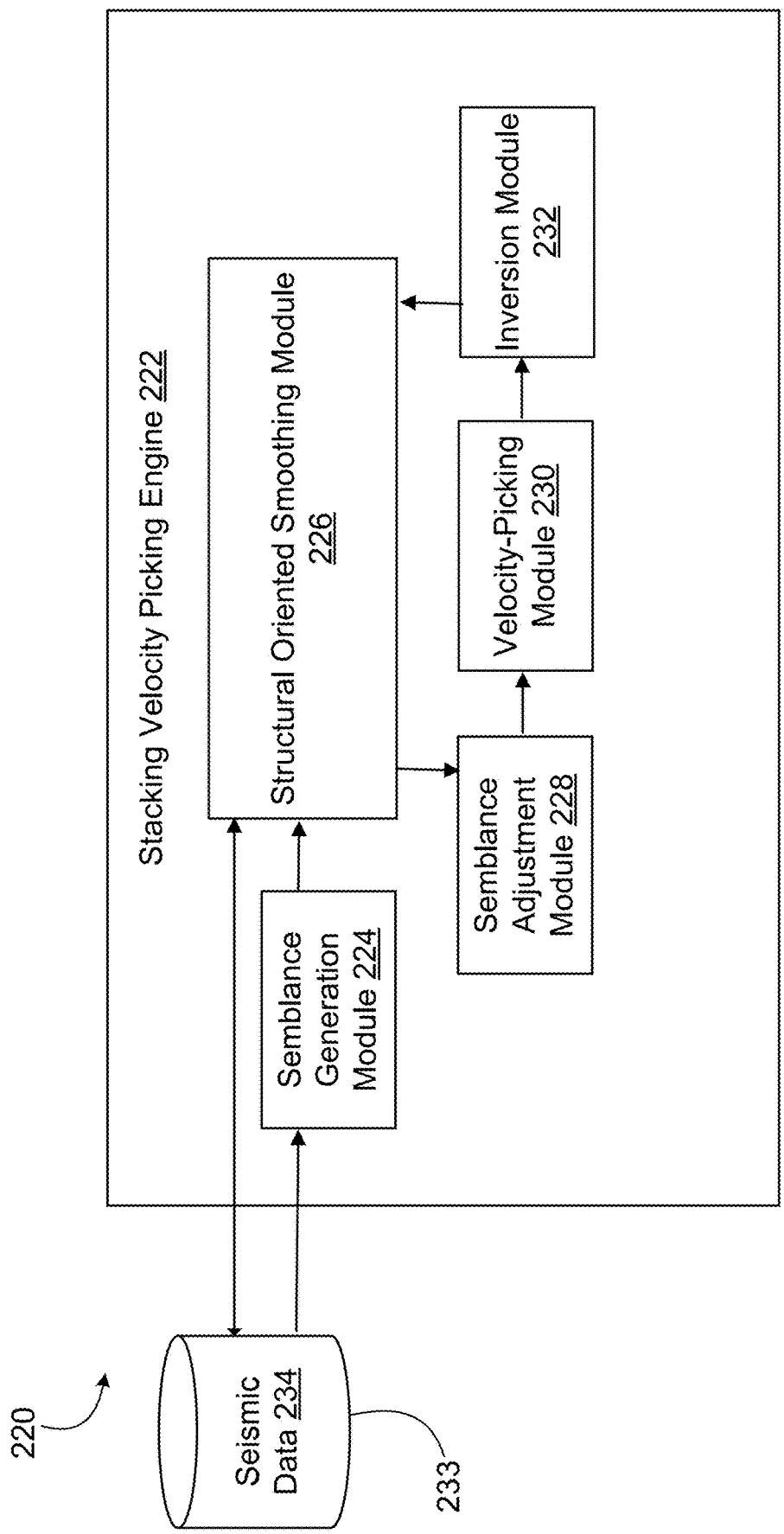
FIG. 5 is a block diagram of an example system for picking seismic stacking velocity.

FIG. 5 is a schematic of a system 220 for picking stacking velocities. The system includes a stacking velocity picking engine 222. The stacking velocity picking engine 222 includes a semblance generation module 224, a structural oriented smoothing module 226, a semblance adjustment module 228, a velocity-picking module 230, and an inversion module 232. The stacking velocity picking engine 222 is in communication with a database 233 storing seismic data 234 and other data regarding the formation.

Figure 6:
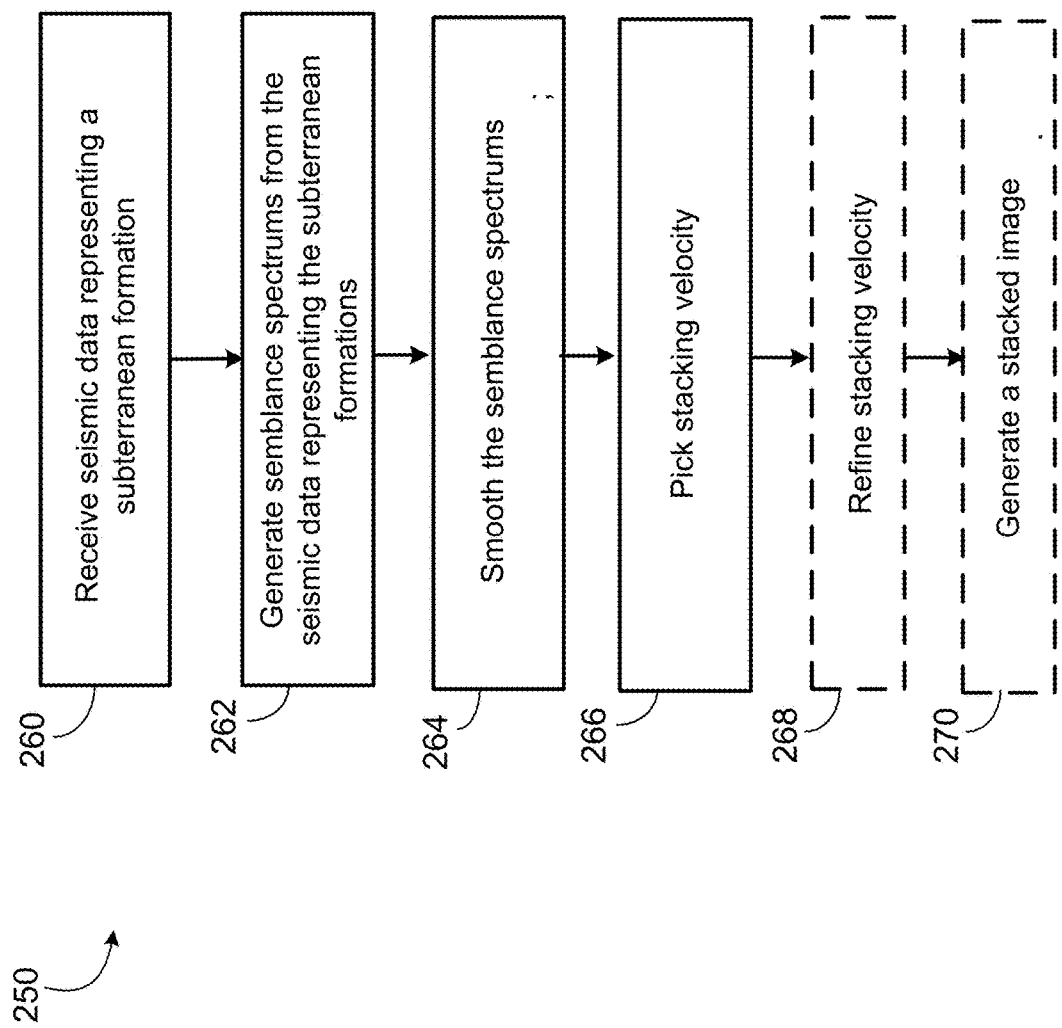
FIG. 6 is a flow diagram of an example process for picking seismic stacking velocity.

FIG. 6 is a flow diagram of a method 250 for picking seismic stacking velocity that can be implemented using the system 220 described with reference to FIG. 5. In general, the method 250 includes receiving seismic data representing a subterranean formation (step 260), generating semblance spectrums from the seismic data representing the subterranean formation (step 262), smoothing the semblance spectrums (step 264), and picking a stacking velocity based on the smoothed semblance spectrums (step 266). Some methods also include refining the stacking velocity (step 268), generating a stacked image (step 270), or both.

The following discussion describes a two-dimensional implementation of the method 250 on the system 220. A prototype of this two-dimensional implementation has been successfully tested and a three-dimensional implementation is being tested.

In the prototype, the stacking velocity picking engine 222 receives the seismic data 234 representing a subterranean formation (step 260) from the database storing seismic data 234. For the two-dimensional implementation, the input data can be labeled as $d(t, x_s, x_g)$ where t is time, and $x_s$ and $x_g$ are x coordinates of source and receiver locations at the earth surface (z=0). There are no y-coordinates in the two-dimensional implementation.

The semblance generation module 224 generates stacked images $I_i$. In the CMP stacking as described with reference to FIGS. 4A-4C, seismic data traces from different source-to-receiver offsets within a CMP gather are stacked by moving them along hyperbolas to zero-offset positions and then adding them together. This process can be represented by Equation 1

$$I_i(t_0, x_c) = \Sigma_{x_{off}} d\left(t_0 + \delta(t_0, x_c, v_i(t_0)), x_c - \frac{x_{off}}{2}, x_c + \frac{x_{off}}{2}\right) \quad (1)$$

Where $t_0$ is the initial time, $x_{off}$ is the offset distance between a specific source and receiver, $x_c$ is the center location between a specific source and receiver, $v_i$ is the velocity, $\delta(x_c, v_i)$ represents the amount of time each trace is shifted, and $$\delta(x_c, v_i) = \sqrt{t_0^2 + (x_{x_{off}}^2/v_i^2)} \quad (2)$$

Here, i indicates the stacked image is made from the $i^{th}$ trial velocity function $v_i(t_0, x_c)$ from a range of trial velocities. The trial velocity functions are generated based on a central reference velocity. A user can specify the upper and lower bounds for the velocity search and an increment interval. The index i is a positive integer number that indicates the number of trial velocities used. Semblance is a quantitative measure of the coherence of seismic data from multiple channels at one common depth point (CDP) location. If the picked stacking velocity is correct, the events in the CDP gather after NMO correction will be flat and coherent. Computational power limits the maximum number of trial velocities that can be used. Typically, either 21 or 41 trial velocities are used. The semblance generation module 224 also stacks the data square according to Equations (1) and (2) to obtain $E_i(t_0, x_c)$, which represents the total energy within a given window.

$$E_i(t_0, x_c) = \sum_{x_{off}} d^2\left(t_0 + \delta(t_0, x_c, v_i(t_0)), x_c - \frac{x_{off}}{2}, x_c + \frac{x_{off}}{2}\right) \quad (3)$$

Based on the stacked images and the total energy, the semblance generation module 224 generates a semblance spectrum panel (step 262) that can be represented as $$S_i(t_0, x_c) = \frac{I_i^2}{N \cdot E_i} \quad (4)$$

where N is the number of offset source-receiver pairs. For a fixed index i, $S_i$ is a 2-dimension panel or map.

Figure 7:
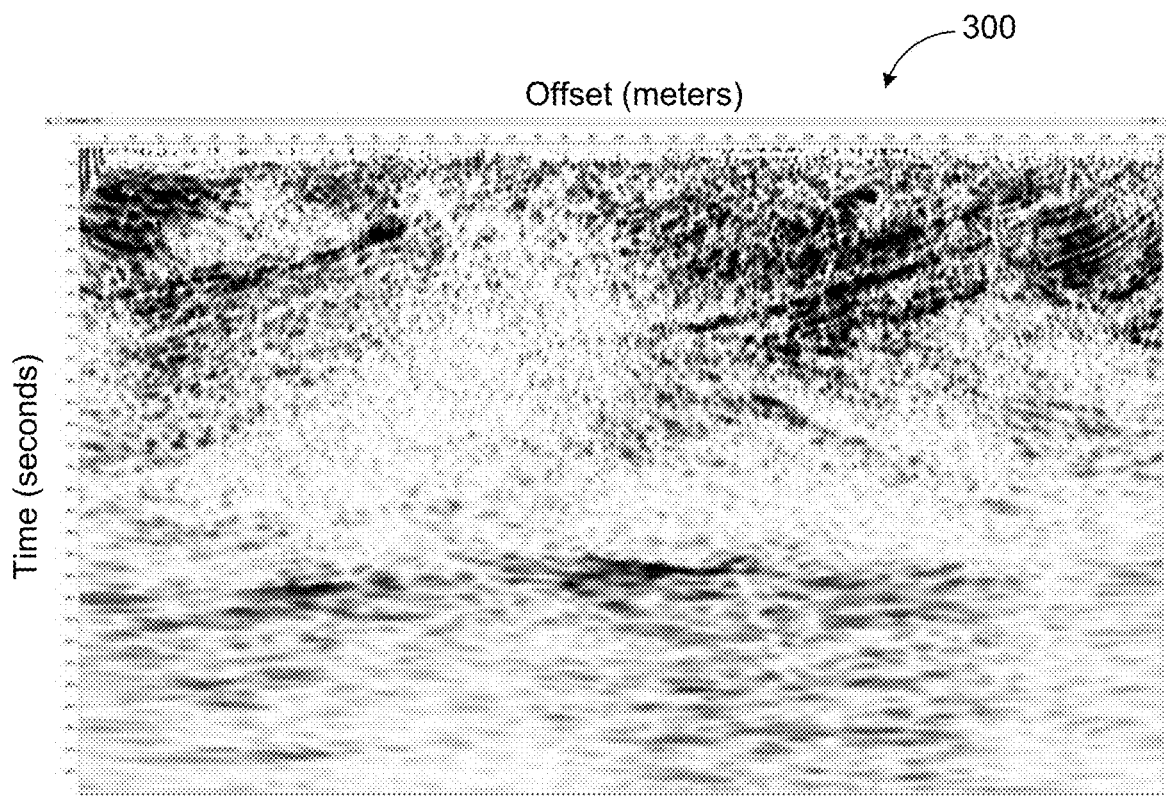
FIG. 7 shows a semblance spectrum panel.

FIG. 7 shows a semblance spectrum panel 300 generated by the prototype. The vertical axis represents two-way travel time in seconds and the horizontal axis is x-coordinates in meters of a seismic line.

Referring again to FIGS. 5 and 6, the semblance generation module 224 provides the semblance spectrum to the structural oriented smoothing module 226. The structural oriented smoothing module 226 is also in communication with the database 233. The semblance spectrum provided by the semblance generation module 224 and data about the structure of the formation generated, for example, by drilling boreholes and provided by the database 233 is passed to the structural oriented smoothing module 226. The information/data of the structure is obtained from a stack image generated using a legacy velocity or less accurate velocity from an earlier processing iteration. From a stack image, the orientation of the seismic events is extracted and used as structural information to guide the structural oriented smoothing module 226 in generating a smoothed semblance spectrum.

Figure 8:
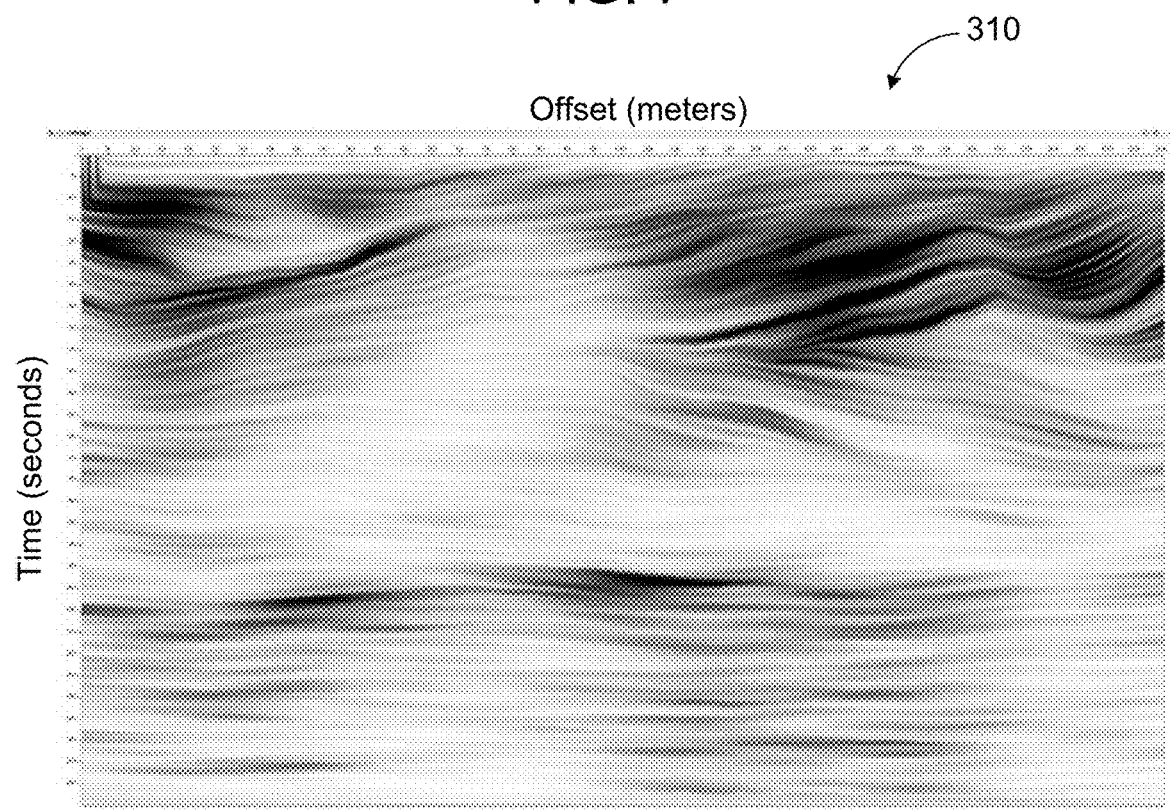
FIG. 8 shows a smoothed semblance spectrum panel.

FIG. 8 shows a smoothed semblance spectrum panel 310 generated by the structural oriented smoothing module 226 of the prototype based on the semblance spectrum panel 300 shown in FIG. 7.

Based on the smoothed semblance spectrum panel 310, the velocity-picking module 230 picks a stacking velocity (step 266). To avoid picking large semblance values resulting from stacking multiples, the velocity-picking module 230 imposes constraints to force the picked velocity to stay close to a guide velocity chosen from the trial velocities. For example, the guide velocity can be a legacy velocity from the same area, or a less accurate velocity from an earlier iteration of processing, or an interpolation of the processor's sparse picking.

The velocity-picking module 230 of the prototype constrains the picked velocity by applying a Gaussian filter $G_i(t_0, x_c)$ on $\overline{S}_i(t_0, x_c)$ in order to decrease the semblance values that are likely resulted from the seismic multiple noise. For example, $$\hat{S}_i(t_0, x_c) = \overline{S}_i * G_i \quad (5)$$

$$G(i) = e^{-\frac{(i - i_c)^2}{\sigma(t_0, x_c)^2}} \quad (6)$$

Other implementations use other approaches to constraining the picked velocity, for example, a seismic processor can pre-process the data using a multiple reduction module. The velocity-picking module 230 of the prototype then picks the stacking velocity at location $x_c$ by simply selecting the local peak amplitude that is nearest to the central velocity after the Gaussian filter is applied.

After velocity-picking module 230 picks the velocities, the inversion module 232 refines the stacking velocity (step 268) using a regularized inversion algorithm. The inversion module 232 of the prototype inverts the picked root mean square (rms) velocity for an interval velocity to mute rapid vertical and spatial variations. The misfit function to be minimized, along with regularization, is $$\|vrms_{cal}^2 - vrms_{obs}^2\| + \lambda_r * \left\|\frac{\partial vint}{\partial t}\right\| + \lambda_x * \left\|\frac{\partial vint}{\partial x}\right\| = \text{MIN} \quad (7)$$

where the relationship of vrms and vint is given by:

$$vrms_{cal}^k = \sqrt{\frac{\sum_{i=1}^k vint_i^2 * \Delta t_i}{\sum_{i=1}^k \Delta t_i}} \quad (8)$$

and $vrms_{cal}$ is the calculated rms velocity, $vrms_{obs}$ is the observed rms velocity, $\lambda_t$ and $\lambda_x$ are weighting factors, $vint_i = vint(i \cdot \Delta t)$, $\Delta t$ is the time sample interval, and $vrms_{cal}^k = vrms_{cal}(k \cdot \Delta t)$. After generating inverted interval velocities, the inversion module 232 compute the final stacking velocity with equation (8).

After obtaining satisfactory velocity, a stacked image is generated (step 270) by running pre-stack time migration on the auto-picked velocity and the seismic data.

Figure 9:
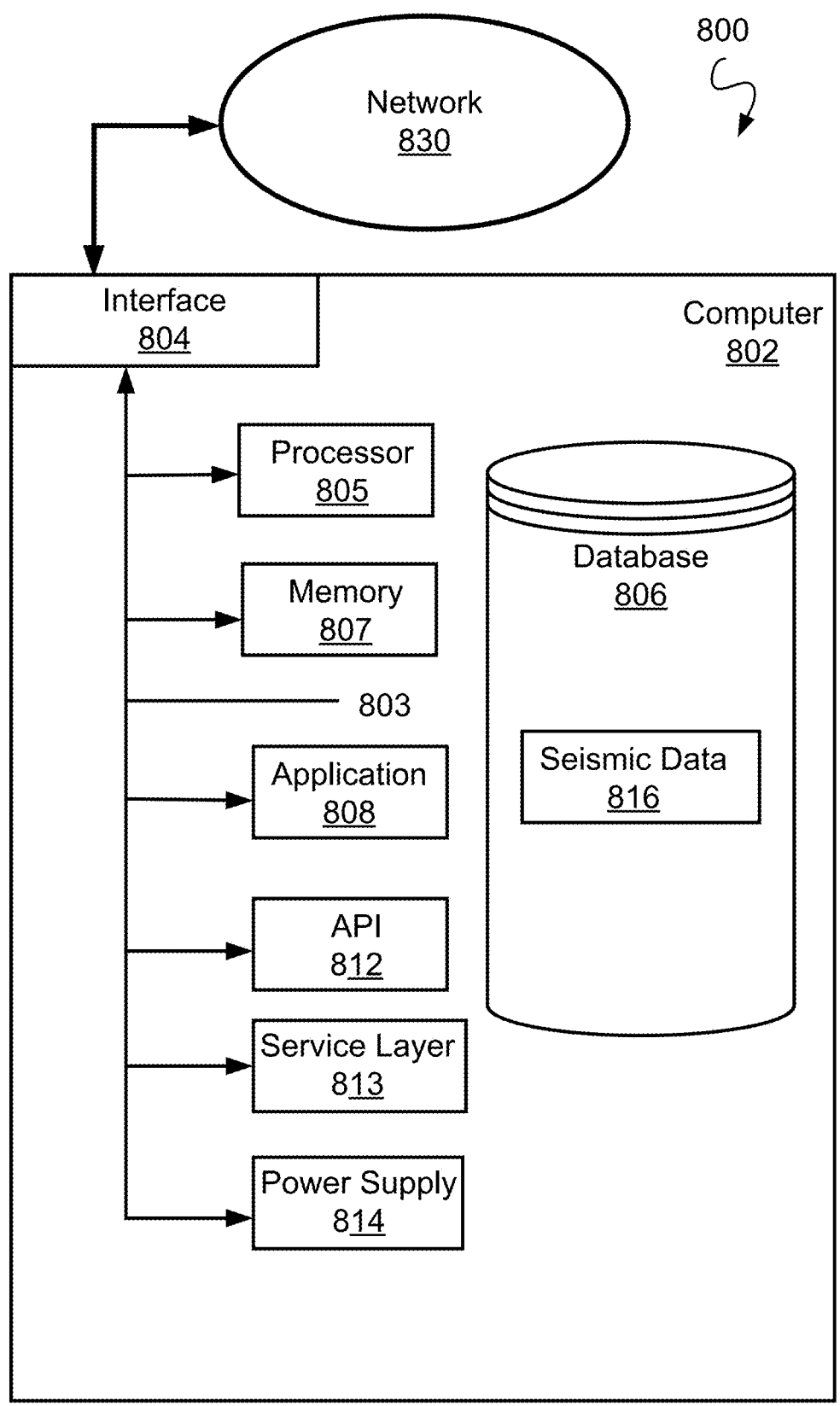
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a high level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the hardware of the interface can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data (for example, seismic data 816) for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for picking seismic stacking velocity based on structures in a subterranean formation, the method comprising:
receiving seismic data representing a subterranean formation;
generating semblance spectrums from the seismic data representing the subterranean formation;
performing structured-oriented-smoothing (SOS) on the semblance spectrums to generate smoothed semblance spectrums, wherein performing the SOS comprises:
extracting, from an image including the semblance spectrums, respective orientations of each of one or more seismic events, the respective orientations representing structural information in the image; and
smoothing the semblance spectrums along the respective orientations representing the structural information in the image; and
picking stacking velocities based on the smoothed semblance spectrums.

2. The method of claim 1, further comprising refining the stacking velocities.

3. The method of claim 2, wherein refining the stacking velocities comprises applying a regularized inversion algorithm.

4. The method of claim 3, wherein applying a regularized inversion algorithm comprises inverting a picked root mean square velocity for an interval to mute rapid vertical and spatial variations.

5. The method of claim 1, further comprising generating a stacked image.

6. The method of claim 1, further comprising generating a set of trial velocities.

7. The method of claim 1, wherein smoothing the semblance spectrums comprises calculating total energy within a window.

8. The method of claim 7, wherein picking stacking velocities based on the smoothed semblance spectrums comprises applying a Gaussian filter to the smoothed semblance spectrums.

9. The method of claim 8, wherein picking stacking velocities based on the smoothed semblance spectrums comprises picking the stacking velocity at each location by selecting a local peak amplitude that is nearest to a central velocity after the Gaussian filter is applied.

10. A system for picking seismic stacking velocity based on structures in a subterranean formation, the system comprising:
a stacking velocity picking engine comprising:
a semblance generation module operable to generates semblance spectrums from seismic data representing the subterranean formation; and
a structural oriented smoothing (SOS) module operable to smooth semblance spectrums based on structures in the subterranean formation by performing operations comprising:
extracting, from an image including the semblance spectrums, respective orientations of each of one or more seismic events, the respective orientations representing structural information in the image; and
smoothing the semblance spectrums along the respective orientations representing the structural information in the image; and
a velocity-picking module operable to picks stacking velocities based on the smoothed semblance spectrums.

11. The system of claim 10, further comprising a semblance adjustment module that reduces semblance values associated with seismic multiples.

12. The system of claim 10, further comprising an inversion module that refines the stacking velocities by applying a regularized inversion algorithm.

13. The system of claim 12, wherein the inversion module applies a regularized inversion algorithm inverting a picked root mean square velocity for an interval to mute rapid vertical and spatial variations.

14. The system of claim 10, wherein the structural oriented smoothing module is operable to generate a stacked image based the stacking velocities picked by the velocity-picking module operable to picks stacking velocities based on the smoothed semblance spectrums.

15. The system of claim 10, wherein the velocity-picking module is operable to generate a set of trial velocities.

16. The system of claim 15, wherein the velocity-picking module is operable to apply a Gaussian filter to the smoothed semblance spectrums.

17. The system of claim 16, wherein the velocity-picking module is operable to select a local peak amplitude that is nearest to a central velocity after the Gaussian filter is applied.

18. The system of claim 10, wherein the structural oriented smoothing module is operable to calculate total energy within a window.

\* \* \* \* \*